(12) United States Patent
Levine

(10) Patent No.: US 7,755,013 B1
(45) Date of Patent: Jul. 13, 2010

(54) LASER GUIDANCE SYSTEM FOR DIAMOND WIRE STONE CUTTING APPARATUS

(75) Inventor: Bart Levine, Mountain Lakes, NJ (US)

(73) Assignee: Western American Mining Company, Austin, TX (US)

( * ) Notice: Subject to any disclaimer, the term of this patent is extended or adjusted under 35 U.S.C. 154(b) by 292 days.

(21) Appl. No.: 12/101,969

(22) Filed: Apr. 12, 2008

(51) Int. Cl.
*G01J 1/20* (2006.01)

(52) U.S. Cl. .................. 250/201.1; 83/289; 125/38; 125/39

(58) Field of Classification Search .............. 250/201.1, 250/559.25, 559.26; 83/289; 125/38, 39
See application file for complete search history.

(56) References Cited

U.S. PATENT DOCUMENTS 5,690,092 A * 11/1997 Ogyu ..................... 125/21
5,732,690 A * 3/1998 Ogyu ..................... 125/30.01

* cited by examiner

*Primary Examiner*—Georgia Y Epps
*Assistant Examiner*—Kevin Wyatt
(74) *Attorney, Agent, or Firm*—Dykas, Shaver & Nipper, LLP; Elizabeth Herbst Schierman

(57) ABSTRACT

Disclosed is a laser guidance system for diamond wire stone cutting apparatus. The laser guidance system includes a targeting laser light source that is fitted to one of two wire guide wheels between which the cutting wire extends and travels. A photo sensor with laser beam detectors is attached to the other wire guide wheel. During ideal operation of the cutting apparatus, the laser beam shines through the kerf in the stone being cut. When the kerf is linearly straight, as intended, the laser beam will be clearly detected by the laser beam detectors. When the kerf is not straight, the laser beam will be at least partially obscured across the cutting span, and the laser beam detectors will detect the lack of full intensity and report this to a controller so as to indicate that adjustments are necessary to re-straighten the kerf.

6 Claims, 3 Drawing Sheets

LASER GUIDANCE SYSTEM FOR DIAMOND WIRE STONE CUTTING APPARATUS

FIELD OF THE INVENTION

The invention relates generally to a system for use in the stone quarrying industry and more particularly to a system for controlling diamond wire cutting machinery used for stone slab and block fabrication.

BACKGROUND OF THE INVENTION

Precision cutting of large stones is efficiently achieved using a continuous cable imbedded with diamond-impregnated beads. The cutting cable, generally referred to as a "diamond wire," is drawn between two wire guide wheels, which are positioned to accommodate the wire's travel across a particular span of space. In this way, the stone to be cut is introduced into the span and into contact with the wire as it quickly travels between the wire guide wheels. As the wire travels, it comes into contact with the stone, and cuts into the slab.

The systems involving a tensioned wire spanning between two wire guide wheels are quite common in the quarrying and saw shop stone cutting industries. Such unguided, cutting wire systems are preferred to bar-guided belts and wires or cutting wheel systems because the unguided, cutting wire systems offer relative simplicity, a capacity for larger cut spans, higher cutting rates, reduced maintenance, and lower capital costs. However, the unguided, cutting wire systems generally suffer from a lower level of cutting precision as compared to the other cutting systems.

In the unguided, cutting wire systems, the "diamond wire" must be held under tension so that the wire will align itself in a straight line between the wire guide wheels. The tension is required in order to achieve the precision of a straight cut. Specifically, the wire must be kept under tension sufficient to eliminate sagging of the wire across the span. Generally, the greater the span distance, the higher the tension under which the wire must operate in order to maintain a stable, straight cut.

Optimal cutting rates and optimal cutting wire draw speeds are generally specified by the diamond wire manufacturer, who takes into consideration such factors as the geometry and material of the cutting surface, the hardness of the stone to be cut, and target tool pressures. Wire draw speeds are generally regulated by motor speed controllers, which monitor operation conditions and compensate for changing operational loads.

During operation of an unguided, cutting wire system, adding cutting loads will elastically stretch the cutting wire, which reduces the precision of the cut. When the tool pressures on the wire are high while the wire is already under tension, the wire will somewhat deform. As long as the total pressure on the wire pressure is within the wire's elastic range, the deformation will be only temporary. On the other hand, when the tension on an unloaded wire is already near the wire's elastic limit, applying tool pressure to the wire commonly brings the total pressure on the wire to a level that exceeds the wire's elastic yield point, which leads to permanent and undesirable deformation of the wire due to the tensile stretching.

Assuming the tensions on the wire are constant, once the wire has been stretched or otherwise deformed the wire will have an undesirable amount of sagging. To avoid this problem, cutting wire systems normally include a feature such as a plumb weight so as to maintain a constant tension on the wire, even after it has been stretched past its elastic limits. However, even with the plumb weight, once a cutting load is applied to the wire, the wire's earlier deformation still leads to instability and decreased cutting precision. Thus, it is important to manage tool loading pressures during system operation so that the loading pressures are within the limits of the cutting wire's elastic stability.

Accordingly, what is needed is a wire cutting system that can continuously detect the precision of cuts being made and modulate the cutting wire's feed rate so as to maximize cutting performance and to extend the working life of the cutting wire.

SUMMARY OF THE INVENTION

Embodiments of the present laser guidance system for diamond wire stone cutting apparatus operatively connects cutting wire speed control to a sensor that detects the straightness of the cutting wire as it cuts into a stone. When the system detects deviation of the kerf or notch being cut from the intended, straight cut path, the system communicates with the wire speed controller, i.e., the subsystem that controls the rate at which the wire cutting system moves between the wire guide wheels, so that the proper adjustment of the travel speed may be made so that the distortion is corrected. Accordingly, the forces on the cutting wire are kept within the wire's maximum acceptable tensile limits and non-straight cuts are quickly righted.

In operation of this laser guidance system, it is assumed that the operator of the system will feed the stone to be cut through the wire cutting system so as to allow for enough pressure by the stone on the wire so that the wire will cut the stone but not so much pressure as to exceed the tensile limits of the wire.

The laser guidance system for diamond wire stone cutting machinery includes a laser light source located at one end of one of the cutting wire guide wheels. The laser is aligned with the intended cutting wire tool path. Attached to the second of the cutting wire guide wheels and opposite of the laser light source is an optical photo sensor. The optical photo sensor acts as the laser beam's target. The sensor is configured to detect when the laser beam is hitting the sensor.

Preferably, the laser light source is a laser that exhibits minimal beam divergence across the cutting span. In addition, it is preferred that the laser beam's width is nearly equal to that of the cutting kerf. It is further preferred that the laser beam's profile be of a Gaussian or normal profile.

Solid-state laser materials may be used, and the laser beam should be of a wavelength that will minimize beam scattering due to cutting particles that will be produced in the space around the cutting zone. Additionally, the wavelength chosen should minimize absorption of the beam into the water vapor that will be emitted from the cutting machinery's cooling system. In some embodiments, the laser beam's pathway may be moved back from the cut zone a distance so that less precise laser beams may be utilized. However, the closer the laser beam's optical pathway is to the cutting line, the lower the time delay between distortion in the kerf path and detection of the distortion by the laser system. In addition, in some embodiments, a diffusion lens may be included between the laser beam source and the oppositely-positioned laser beam detector so as to minimize errors of detection that would otherwise be introduced by use of laser beams with poor quality.

The photo sensor, located on the wire guide wheel opposite of the wire guide wheel to which the laser beam source is attached, contains at least one laser beam detector that is sensitive to the laser beam deployed by the laser beam source. In embodiments where only one laser beam detector is incorporated in the photo sensor, the laser beam detector is preferably configured so that the detector is an analog detector that is further configured to interpret the relative intensity of the detected laser light. The detector then communicates this relative value to a control system.

This analog laser beam detector is configured to detect and communicate a range of intensity values beginning with a completely obscured laser beam as the minimum value to a completely unobscured laser beam as the maximum value. The detector is further configured to be sensitive to the continuum of laser beam intensities between the minimum and maximum values and configured to communicate the detected intensities to the control system.

In other embodiments, a plurality of laser beam detectors may be included in the photo sensor. In such embodiments, the photo sensor will exhibit digital, rather than analog, detection abilities. Ideally, the plurality of laser beam detectors are arranged in a linear array aligned normal to the cutting plane so that the detectors will be sensitive to coplanar cutting errors. Preferably, the laser beam width used in this embodiment would be a width configured to envelop the plurality of linearly-arranged detectors.

During use, when the laser beam becomes completely obscured from contacting one of the linearly-arranged detectors while being at least partially not obscured from contacting another of the linearly-arranged detectors, by communicating which of the detectors remain capable of detecting the laser beam to the controller, the controller can determine in which direction the kerf has become distorted and make the necessary adjustment to the cutting wire speed to bring the kerb back to the intended, straight cut path.

The purpose of the foregoing summary is to enable the public, and especially the scientists, engineers, and practitioners in the art who are not familiar with patent or legal terms or phraseology, to determine quickly from a cursory inspection, the nature and essence of the technical disclosure of the application. The summary is neither intended to define the invention of the application, which is measured by the claims, nor is it intended to be limiting as to the scope of the invention in any way.

Still other features and advantages of the present laser guidance system will become readily apparent to those skilled in this art from the following detailed description describing preferred embodiments of the laser guidance system, simply by way of illustration of the best mode contemplated by carrying out the system. As will be realized, the system is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1:
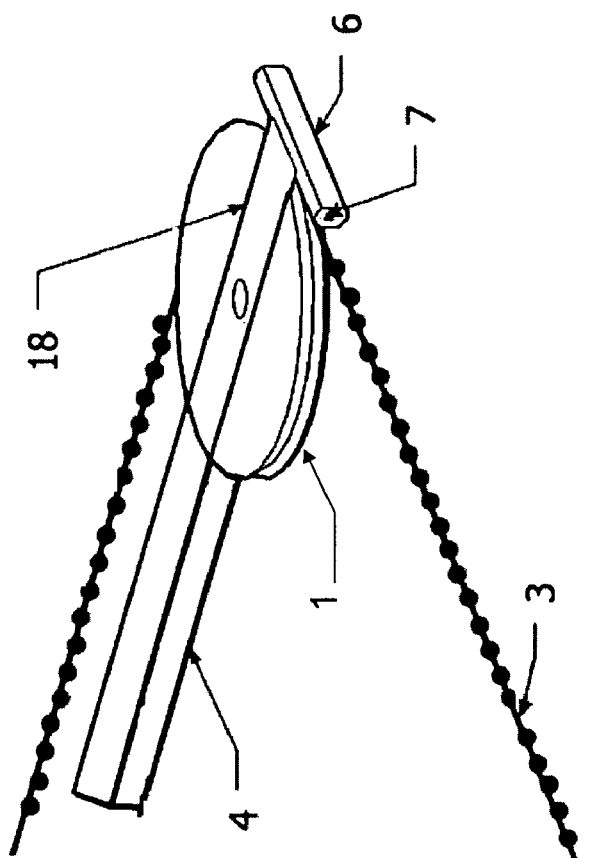
FIG. 1 is an isometric, perspective view of a laser guidance system for diamond wire stone cutting apparatus according to a first embodiment.
Figure 1:
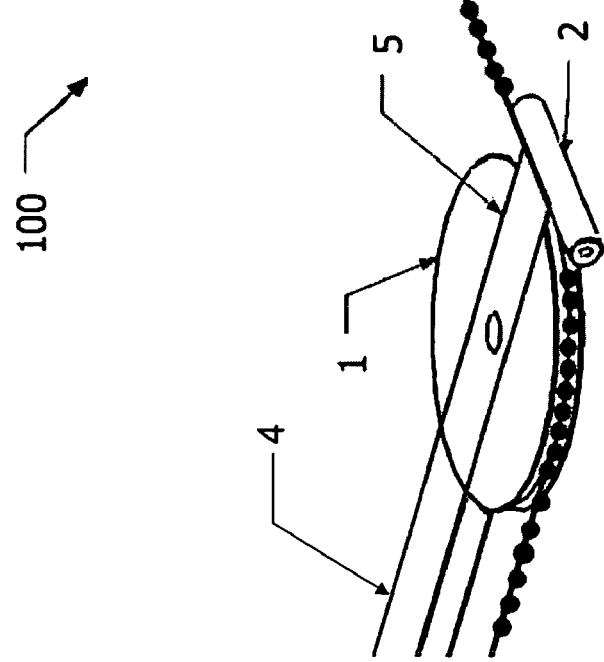

While the system is susceptible of various modifications and alternative constructions, certain illustrated embodiments thereof have been shown in the drawings and will be described below in detail. It should be understood, however, that there is no intention to limit the system to the specific form disclosed, but, on the contrary, the system is to cover all modifications, alternative constructions, and equivalents falling within the spirit and scope of the invention as defined in the claims.

As shown in the figures for purpose of illustration, the laser guidance system for diamond wire stone cutting apparatus is embodied in a diamond wire cutting subsystem 100 having two wire guide wheels 1, a diamond cutting wire 3, a laser light source 2, and a photo sensor 6.

In the following description and in the figures, like elements are identified with like reference numerals. The use of "or" indicates a non-exclusive alternative without limitation unless otherwise noted. The use of "including" or "having" means "including, but not limited to, unless otherwise noted."

Figure 2:
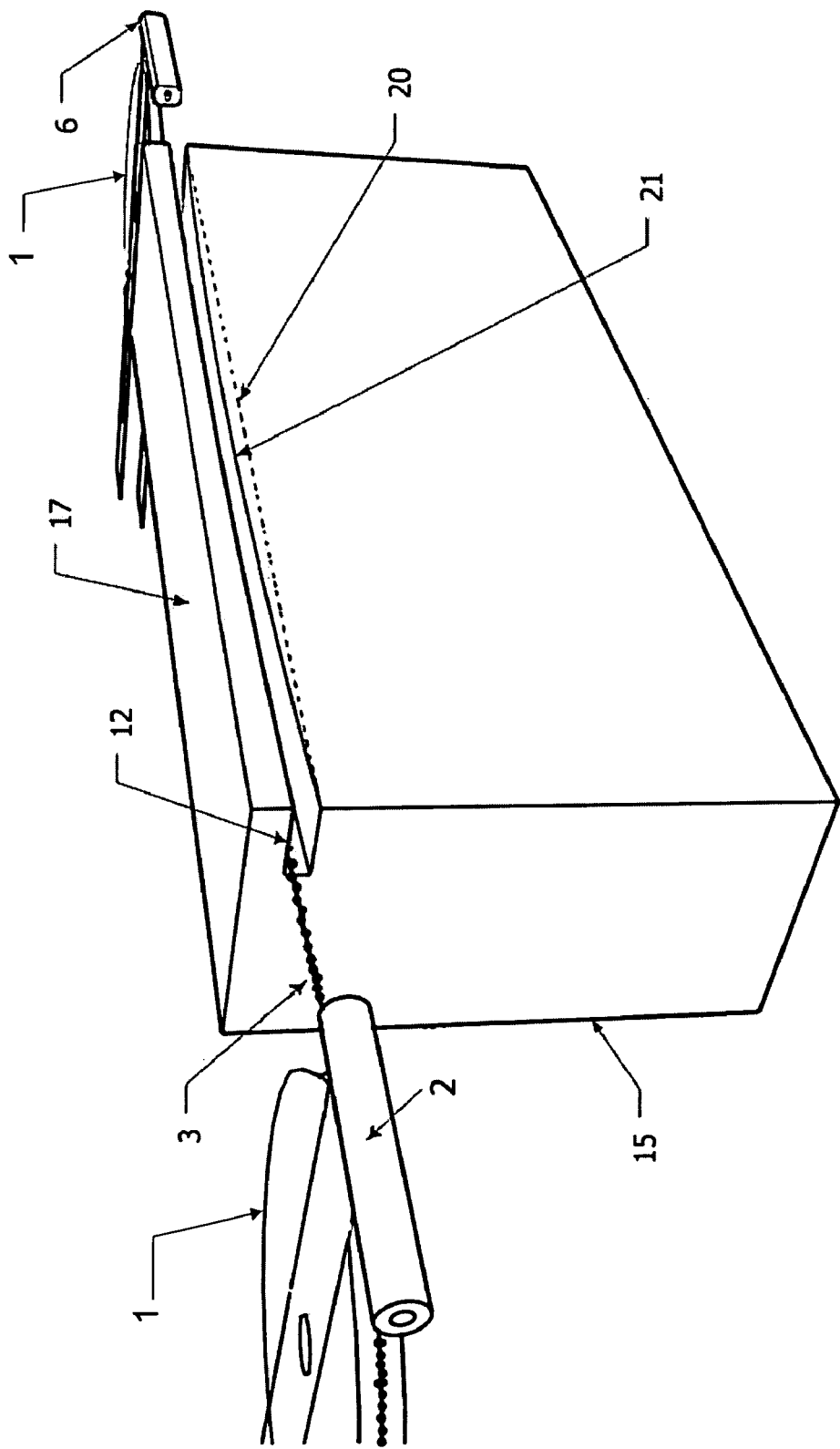
FIG. 2 is an isometric, perspective view of the laser guidance system for diamond wire stone cutting apparatus according to the first embodiment.
Figure 3:
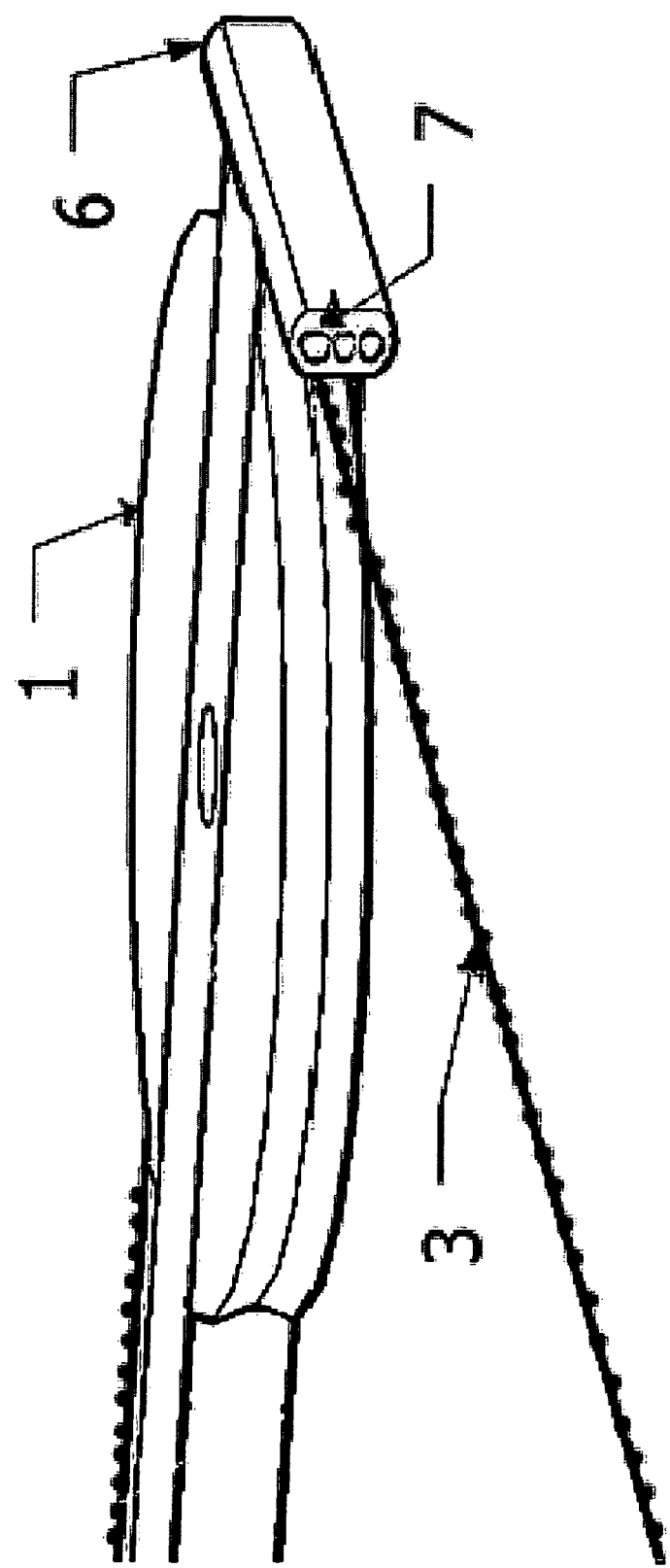
FIG. 3 is a partial, isometric, perspective view of the laser guidance system for diamond wire stone cutting apparatus according to a second embodiment.

A first preferred embodiment of the laser guidance system for diamond wire stone cutting apparatus is shown in FIGS. 1 and 2. A second preferred embodiment of the system is shown in FIG. 3. In both embodiments, the diamond wire cutting subsystem 100 of the diamond wire stone cutting apparatus includes at least two coplanar wire guide wheels 1, each supported by one cutting arm 4 and each located on separate sides of a cutting span traveled by a diamond cutting wire 3 that is guided in its travels across the span by the two wire guide wheels 1. The wire guide wheels 1 are configured to suspend the diamond cutting wire 3 across the span in rigid tension.

The diamond wire cutting subsystem 100 further includes a laser light source 2 attached to the first of the wire guide wheels 1 and a photo sensor 6 attached to the second of the wire guide wheels 1. The laser light source 2 is attached to the first wire guide wheel 1 via a bracket 5. The photo sensor 6 is attached to the second wire guide wheel 1 via a similar bracket 18. The laser light source 2 and the photo sensor 6 are aligned so that the photo sensor 6 is situated opposite of the laser light source 2 and so that the laser light source 2 will project a laser beam along the path of the diamond cutting wire 3 when the path of the diamond cutting wire 3 is cutting in the intended, straight cutting path, i.e., when the diamond cutting wire 3 is not upwardly or downwardly distorted.

In the first preferred embodiment, shown in FIGS. 1 and 2, the photo sensor 6 includes a single laser beam detector 7. According to this embodiment, the laser beam detector 7 is configured to monitor whether or not the laser beam emitted by the laser light source 2 is detectable. Ideally, the laser beam detector 7 will be further configured to detect the intensity of the laser beam when the beam is detectable. In either case, when the cutting wire 3 is not distorted upwardly or downwardly, the cutting wire 3 will cut essentially horizontally through a stone block 15 so as to cut a stone slab 17. Thus, ideally, the intended, straight cutting path results in a perfectly straight kerf or cutting notch.

When the diamond cutting wire 3 is performing as intended, i.e., when the kerf follows the intended, straight cutting path, the laser beam emitted by the laser light source 2 and aimed through the kerf toward the photo sensor 6 will be unobstructed and so fully detectable by the laser beam detector 7. Thus, the laser beam detector 7 will detect a beam of maximum intensity. The laser beam detector 7 will communicate this maximum intensity reading to the speed controller (not shown), and, because the kerf will be of the desired straightness, the speed controller will determine that the speed of the cutting wire 3 will not need to be changed.

When the cutting wire 3 has become distorted, such as when its elastic or tensile limits have been exceeded, the cutting path through the stone block 15 will likely deviate from the intended, straight cutting path 20 (shown in FIG. 2) such that it will not be essentially horizontal but will more likely bow or curve undesirably, as shown by the stone crown segment 21 in FIG. 2. In such a case, the path of the laser beam emitted from the laser light source 2 will be at least partially obscured by the stone crown segment 21. When the cutting path deviates only slightly from the ideal cord line 20, the laser beam will be only partially obscured. The laser beam detector 7 will detect the partial obscurity and report the condition to the speed controller, which will make the necessary adjustment to the speed of the cutting wire 3 so as to bring the cutting wire 3 back into condition for making the intended, straight cutting path. When the cutting path deviates more significantly from the ideal cord line 20, the laser beam will be completely obscured, and the laser beam detector 7 will detect the minimum level of intensity and report this to the speed controller so that the necessary cutting wire 3 speed adjustment will be made.

In the second preferred embodiment, shown in FIG. 3, the photo sensor 6 includes three, discrete, vertically-and-linearly-aligned laser beam detectors 7. With such an embodiment, the laser beam detectors 7 may be configured to detect simply whether or not the laser beam is detected, rather than the intensity level of beam detected. This on-off detection configuration has the benefit of being simpler than the intensity-continuum reading detector of the first embodiment.

With the three discrete, vertically-and-linearly-aligned laser beam detectors 7, the laser guidance system will be able to communicate to the speed controller the vertical direction of the cutting path's distortion. For example, when the kerf is convex upward, as shown by the stone crown segment 21 in FIG. 2, the lowest of the three, discrete, vertically-and-linearly-aligned laser beam detectors 7 will be unable to detect the laser beam because the beam will be most obscured in the lowest portions of the beam. At the same time, the upper-most of the laser beam detectors 7 will still be able to detect the laser beam. From this data, the speed controller will be able to determine the best adjustments to make so as to lower the arch of the cutting wire's 3 cutting path, such as by decreasing the speed of the cutting wire 3. Conversely, when the kerf is concave downward from the ideal path, the lowest of the laser beam detectors 7 will detect the beam while the uppermost laser beam detector 7 will be unable to detect the beam. This information will be communicated to the speed controller, which will then be able to make the appropriate correct to raise the arch of the cutting wire's 3 cutting path, such as by increasing the tension of the cutting wire 3 to reduce sagging.

The exemplary embodiments shown in the figures and described above illustrate but do not limit the invention. It should be understood that there is no intention to limit the system to the specific form disclosed; rather, the system is to cover all modifications, alternative constructions, and equivalents falling within the spirit and scope of the invention as defined in the claims. For example, while the system is not limited to use with stone, it is expected that various embodiments of the system will be particularly useful for stone cutting apparatus. Nonetheless, the system is likely to be useful in other cutting activities. Hence, the foregoing description should not be construed to limit the scope of the invention, which is defined in the following claims. Accordingly, while there is shown and described the present preferred embodiments of the system, it is to be distinctly understood that this system is not limited thereto but may be variously embodied to practice within the scope of the following claims. Further, from the foregoing description, it will be apparent that various changes may be made without departing from the spirit and scope of the invention as defined by the following claims.

What is claimed is:

1. An optical guidance system for cutting wire machinery having a cutting wire guided by a first and second cutting wire guide, each of said cutting wire guides oriented opposite one another, said cutting wire guides configured to guide said cutting wire as it travels across a cutting wire span between said cutting wire guides, said cutting wire configured to cut a kerf into a solid slab when said solid slab comes into contact with said cutting wire guide as it travels across said cutting wire span, said optical guidance system comprising:

a light emitter fixedly attached to said first cutting wire guide, said light emitter configured to traverse a beam of light across said cutting wire span; said light emitter further configured to traverse said beam of light through said kerf; and at least one light detector fixedly attached to said second cutting wire guide, each of said light detectors being oriented essentially opposite of said light emitter, said light detectors being further configured to detect said beam of light when said beam of light is not obscured over said cutting wire span such as when said kerf conforms to an intended straight cutting path; each of said light detectors being further configured to communicate detection of said beam of light to a controller;

wherein said light emitter directs said beam of light toward said light detectors so that said beam of light travels through said cutting wire span in a beam trajectory that corresponds to said intended straight cutting path;

wherein, when said kerf conforms to said intended straight cutting path, said beam of light will travel through said kerf and to said light detectors where said light detectors will detect said beam of light, said light detectors configured to communicate such detection to said controller as an indication of proper performance by said cutting wire; and wherein, when said kerf does not conform to said intended straight cutting path, said beam of light will be at least partially obscured as it travels through said kerf such that at least one of said light detectors will not receive a full intensity of said beam of light, said light detectors configured to communicate such lack of reception of full intensity to said controller as an indication of non-proper performance by said cutting wire.

2. The optical guidance system of claim 1, wherein said light emitter comprises a laser light source.

3. The optical guidance system of claim 1, wherein at least one of said light detectors is configured to detect whether or not said beam of light is detectable and further configured to communicate such detection to said controller.

4. The optical guidance system of claim 1, wherein at least one of said light detectors is configured to detect intensity levels of light received from said light emitter and to communicate such detected intensity levels to said controller.

5. The optical guidance system of claim 1, wherein said optical guidance system comprises at least three light detectors including an uppermost light detector and a lowermost light detector, said light detectors being linearly and vertically aligned;

wherein, when said kerf does not conform to said intended straight cutting path in that said kerf bows upward, said lowermost light detector will detect less light than said uppermost light detector, said light detectors configured to communicate such detection or lack thereof to said controller as an indication that said kerf bows upward; and wherein, when said kerf does not conform to said intended straight cutting path in that said kerf bows downward, said uppermost light detector will detect less light than said lowermost light detector, said light detectors configured to communicate such detection or lack thereof to said controller as an indication that said kerf bows upward.

6. The optical guidance system of claim 1 wherein said light detectors are contained within a photo sensor that is fixedly attached to said second cutting wire guide.

\* \* \* \* \*